(12) United States Patent
Herrig et al.

(10) Patent No.: US 9,595,884 B2
(45) Date of Patent: Mar. 14, 2017

(54) SUB-SEA POWER SUPPLY AND METHOD OF USE

(71) Applicant: General Electric Company, Schenectady, NY (US)

(72) Inventors: Andreas Herrig, Bavaria (DE); Christof Martin Sihler, Baden-Wuertemberg (DE); Fabio Carastro, Bavaria (DE)

(73) Assignee: GENERAL ELECTRIC COMPANY, Schenectady, NY (US)

(*) Notice: Subject to any disclaimer, the term of this patent is extended or adjusted under 35 U.S.C. 154(b) by 100 days.

(21) Appl. No.: 14/575,492

(22) Filed: Dec. 18, 2014

(65) Prior Publication Data

US 2016/0181943 A1  Jun. 23, 2016

(51) Int. Cl.
*H02M 7/10* (2006.01)
*F03B 13/10* (2006.01)
*E02D 29/09* (2006.01)
*H01F 27/28* (2006.01)

(52) U.S. Cl.
CPC ............. *H02M 7/10* (2013.01); *E02D 29/06* (2013.01); *F03B 13/10* (2013.01); *H01F 27/28* (2013.01)

(58) Field of Classification Search
CPC .... H02M 7/10; Y10T 307/25; Y10T 307/258; H02J 1/102
USPC .......................... 363/67, 68; 307/12, 82, 151
See application file for complete search history.

(56) References Cited

U.S. PATENT DOCUMENTS

| | | | | | |
|---|---|---|---|---|---|
| 4,979,087 | A | * | 12/1990 | Sellwood | H01F 38/14 363/34 |
| 5,457,988 | A | * | 10/1995 | Delatorre | E21B 17/01 340/854.6 |
| 6,229,722 | B1 | * | 5/2001 | Ichikawa | H02M 7/10 363/71 |
| 7,093,661 | B2 | | 8/2006 | Olsen | |
| 7,163,624 | B2 | | 1/2007 | Nilsen et al. | |
| 7,224,080 | B2 | | 5/2007 | Smedstad | |
| 7,749,459 | B2 | | 7/2010 | Nilsen et al. | |
| 8,002,876 | B2 | | 8/2011 | Frank et al. | |
| 8,591,714 | B2 | | 11/2013 | Sams et al. | |
| 8,692,408 | B2 | * | 4/2014 | Zhang | H02M 5/458 307/12 |
| 8,778,159 | B2 | | 7/2014 | Liverud et al. | |
| 2003/0010500 | A1 | * | 1/2003 | Smith | E21B 47/0001 166/336 |

(Continued)

OTHER PUBLICATIONS

Wallace et al. "Compact Electrostatic Separation Process." 2008 Offshore Technloogy Conference. May 2008.

(Continued)

*Primary Examiner* — Adolf Berhane
(74) *Attorney, Agent, or Firm* — Armstrong Teasdale LLP (57) ABSTRACT

A sub-sea power supply includes a plurality of transformers, a wet-mateable connector, and a plurality of passive rectifier circuits. Each transformer includes a primary coil and secondary coil. The primary coils are coupled in parallel. The wet-mateable connector is coupleable to a sub-sea AC power source. The wet-mateable connector is coupled to the primary coils. The plurality of passive rectifier circuits is respectively coupled to the secondary coils. The plurality of passive rectifier circuits is configured to generate substantially uniform polarity voltage outputs coupled in series.

19 Claims, 5 Drawing Sheets

(56) References Cited

U.S. PATENT DOCUMENTS

| | | | | |
|---|---|---|---|---|
| 2009/0146603 A1* | 6/2009 | Sihler | ................... | H02M 3/158 |
| | | | | 318/812 |
| 2009/0159426 A1 | 6/2009 | Chen | | |
| 2010/0213921 A1* | 8/2010 | Abolhassani | ......... | H01F 27/385 |
| | | | | 323/328 |
| 2014/0209465 A1 | 7/2014 | Whitney et al. | | |
| 2014/0217947 A1 | 8/2014 | Haugan | | |

OTHER PUBLICATIONS

Brocilo et al. "Modelling of the effect of electrode geometries on the corona discharge current-voltage characteristic for wire-plate electrostatic precipitators." 2001 Annual Report Conference on Electrical Insulation and Dielectric Phenomena. 681-684. Oct. 2001.

\* cited by examiner

SUB-SEA POWER SUPPLY AND METHOD OF USE

BACKGROUND

The field of the disclosure relates generally to sub-sea separator systems and, more particularly, to a sub-sea power supply and a method of use thereof.

Sub-sea oil and gas production is generally constrained by topside facilities used for various processes, including, without limitation, separation. Shifting processing to the sea floor improves recovery, accelerates production, reduces water disposal to sea, and enhances flow management. Additionally, shifting processing to the sea floor saves space on topside facilities and reduces cost.

The separation process includes liquid-liquid separation and gas-liquid separation. More specifically, gas is separated from the liquid and water is separated from the oil. Several known techniques exist for liquid-liquid and gas-liquid separation, including, without limitation, gravity separators, centrifugal separators, and electrostatic separators. In sub-sea processing, gravity systems are most common. Electrostatic systems and centrifugal systems are typically available for topside processing.

Known electrostatic gas-liquid separators use a high voltage to generate a strong electric field through which a fluid flows. The electric field charges liquid particles in the fluid. Charged liquid particles are then precipitated from the uncharged gas particles in the fluid, separating the gas and liquid. Certain known electrostatic liquid-liquid separators use high frequencies and high voltages to charge and separate the liquid particles. Sub-sea application of electrostatic separation remains challenging because preferable high voltages and sufficient power levels are difficult to efficiently deliver to the sea floor. More specifically, high DC voltages (in excess of 20,000 Volts) are faced with limitations in known wet-mateable connectors and known short-circuit protection features. Furthermore, production and maintenance costs, availability, and reliability for sub-sea components are generally prohibitive. Many known high-voltage supplies are not suitable for failure free operation without maintenance for up to several decades.

BRIEF DESCRIPTION

In one aspect, a sub-sea power supply is provided. The sub-sea power supply includes a plurality of transformers, a wet-mateable connector, and a plurality of passive rectifier circuits. Each of the plurality of transformers includes primary coils and secondary coils. The primary coils are coupled in parallel. The wet-mateable connector is coupleable to a sub-sea AC power source. The wet-mateable connector is coupled to the primary coils. The plurality of passive rectifier circuits is respectively coupled to the secondary coils. The plurality of passive rectifier circuits is configured to generate substantially uniform polarity voltage outputs coupled in series.

In another aspect, a method of operating a sub-sea power supply is provided. The method includes receiving a first three-phase voltage AC signal at a plurality of transformers. The plurality of transformers are disposed at a sea floor. The method also includes transforming the first three-phase voltage AC signal at the plurality of transformers to a plurality of second three-phase voltage AC signals. The plurality of second three-phase voltage AC signals being higher voltage than the first three-phase voltage AC signal. The method further includes rectifying the plurality of second three-phase voltage AC signals to a plurality of low voltage-quality DC signals.

In yet another aspect, a sub-sea separator system is provided. The sub-sea separator system includes a wet-mateable connector, a plurality of transformers, a plurality of rectifiers, a plurality of bypass switches, and an electrostatic separator. The plurality of transformers is coupled in parallel to the wet-mateable connector. The plurality of transformers is configured to transform a first voltage AC signal receivable at the wet-mateable connector to a plurality of second voltage AC signals. The plurality of second voltage AC signals are higher voltage than the first voltage AC signal. The plurality of rectifiers is respectively coupled to the plurality of transformers. The plurality of rectifiers is configured to rectify the plurality of second voltage AC signals to a plurality of DC voltage signals. Each of the plurality of rectifiers includes output terminals across which the plurality of DC voltage signals are presentable. The plurality of bypass switches is respectively coupled in parallel with the output terminals. The plurality of bypass switches is further coupled in series. The electrostatic separator is coupleable across the plurality of bypass switches. The electrostatic separator is configured to receive a third voltage DC signal from the plurality of rectifiers. The third voltage DC signal includes a sum of the plurality of DC voltage signals and is higher voltage than the plurality of second voltage AC signals.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to sub-sea power supplies for operating a compact electrostatic separator. The power supply systems described herein provide reliable sub-sea high-voltage power supplies and, more specifically, transformation, rectification, and switching circuits utilizing predominantly passive components. The realization that electrostatic separators can accept low voltage-quality power permits use of passive component rectifiers that produce low frequency ripples in the substantially DC output. Further, exemplary power supply systems utilize a medium voltage AC input and low turn ratio transformers to step-up the AC voltage. Exemplary power supply systems facilitate installation of compact electrostatic separators on the sea floor, which improves separation efficiency, reduces capital expenditures on equipment procurement, transportation, and installation, and further reduces costs for maintenance and repair by use of reliable and durable passive components.

Figure 1:
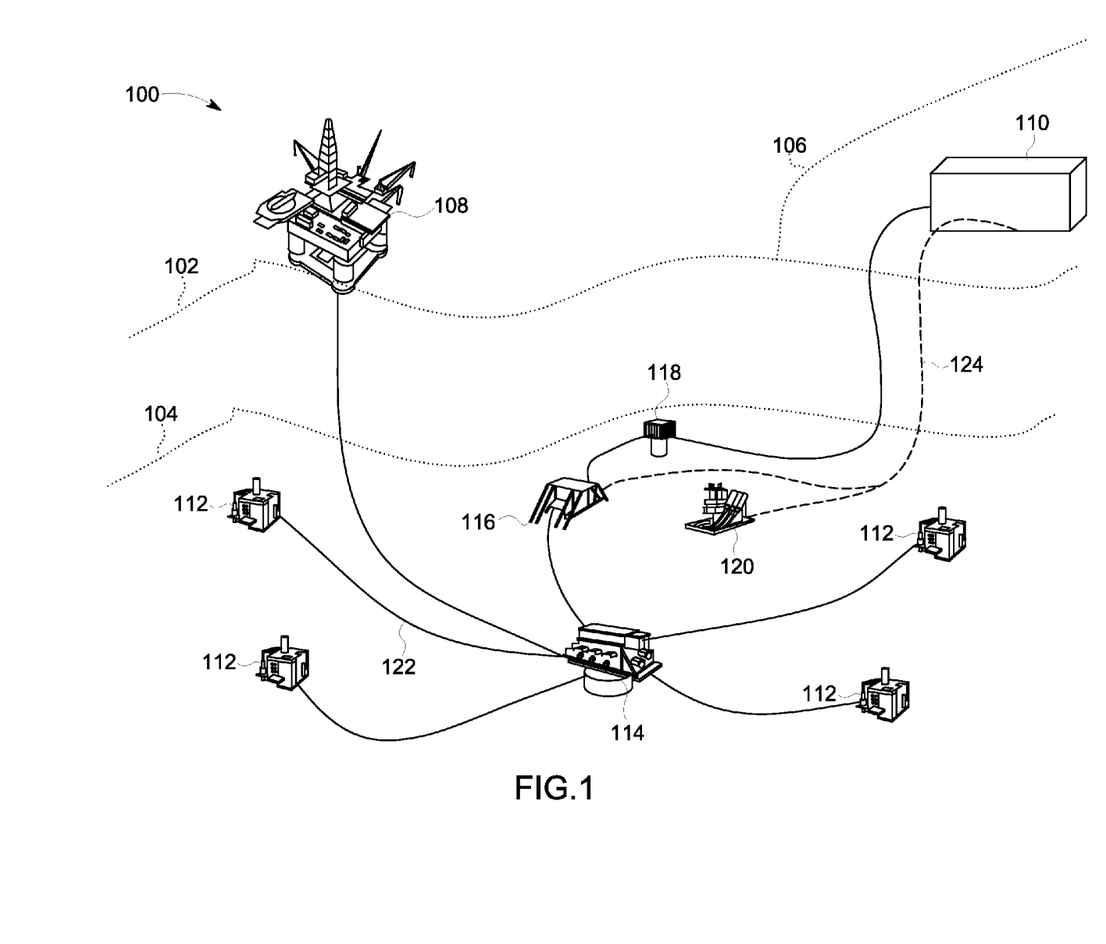
FIG. 1 is a diagram of an exemplary sub-sea oil and gas factory.

FIG. 1 is a diagram of an exemplary sub-sea oil and gas factory 100. Factory 100 includes elements at a water surface 102, at a sea floor 104, and on land 106. Factory 100 includes, without limitation, a platform 108 at water surface 102. Factory 100 also includes, without limitation, a topside facility 110 at land 106. The sub-sea portion of factory 100 includes, at sea floor 104, and without limitation, well heads 112, a manifold 114, a separator 116, a booster 118, and a power station 120. The various elements of factory 100 are interconnected by pipelines 122 and power transmission lines 124.

Well heads 112 extract fluid (not shown) from a sub-sea reservoir (not shown). The fluid generally includes oil, gas, water, and other by-products. Alternative embodiments may include additional well heads 112. Other embodiments may include fewer well heads 112. Well heads 112, in certain embodiments, may also carry out various processes that can include, without limitation, injecting a compressed fluid into the reservoir to increase well pressure. Fluids extracted by well heads 112 are routed to manifold 114 via pipelines 122.

Manifold 114 gathers and routes extracted fluids from well heads 112. Manifold 114 may also receive processed fluids (not shown) from other sub-sea equipment, including and without limitation, separator 116 and booster 118. Manifold 114 may direct fluids to other elements of factory 100, including and without limitation platform 108, separator 116, booster 118, and topside facility 110.

Separator 116 receives and processes extracted fluid to separate the oil and gas from other fluids or elements, including and without limitation, water and sand. Separator 116 carries out liquid-liquid separation to separate oil from water. In addition, separator 116 carries out gas-liquid separation to separate gas from oil and water. Separator 116 includes one or more separation stages to carry out the various aspects of separation. Each stage of separator 116 includes one or more types of separators, including and without limitation, gravity based separators, centrifugal based separators, and electrostatic separators. The products of separator 116 are routed to various other equipment for reuse, storage, or further processing. For example, and without limitation, water separated from the oil and gas, which is sometimes referred to as produced water, may be transported away or reintroduced to the sea. Separated oil and gas is routed to other equipment for processing, to platform 108 at water surface 102, or to topside facility 110.

Booster 118 facilitates transport of fluids from sea floor 104 to water surface 102 or land 106. When factory 100 includes well heads 112 and various other equipment at depth, it is sometimes necessary to include one or boosters 118 to force the fluids up to their destination, which may include, without limitation, platform 108 or topside facility 110.

Well heads 112, manifold 114, separator 116, and booster 118 generally require some amount of power to operate. Power station 120 may include one or more transformers, switch gear, and other power distribution components (all not shown) to deliver the appropriate power to the various elements of factory 100. Power station 120 utilizes topside facility 110 as its power source, which may include, without limitation, a generator, a variable frequency drive, transformers, switch gear, and other power distribution components (all not shown) for generating the required power. Topside facility 110 delivers the source power to power station 120 via power transmission line 124. Power transmission line 124, in certain embodiments, may be included in a sub-sea umbilical that couples topside facility 110 to the sub-sea portion of factory 100.

Figure 2:
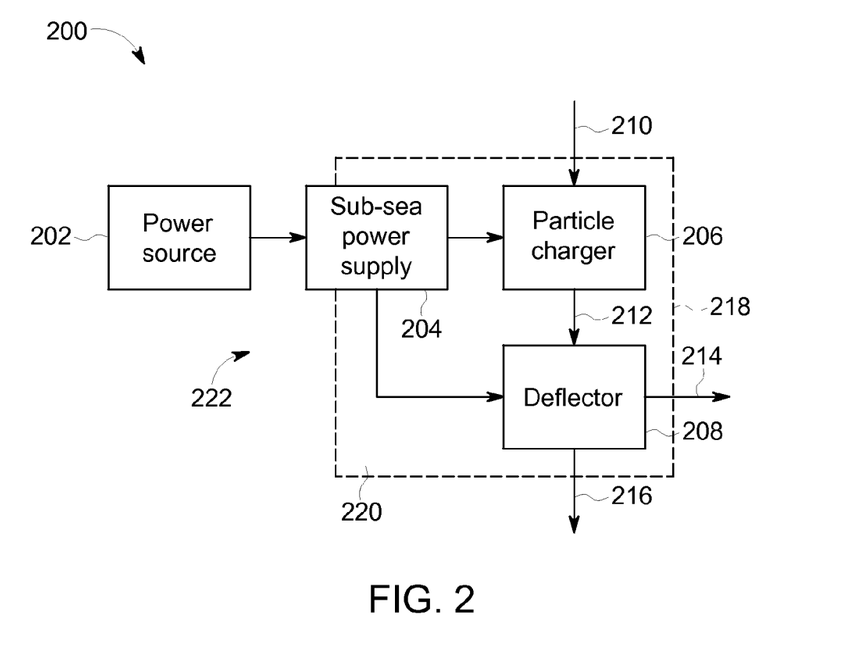
FIG. 2 is a block diagram of an exemplary compact electrostatic separator system for use in the sub-sea oil and gas factory shown in FIG. 1.

FIG. 2 is a block diagram of an exemplary compact electrostatic separator system 200 for use in sub-sea oil and gas factory 100 (shown in FIG. 1). Compact electrostatic separator system 200 includes a power source 202, a sub-sea power supply 204, a particle charger 206, and a deflector 208. During operation, an extracted fluid 210 passes through particle charger 206, yielding a charged fluid 212 that passes through deflector 208. Deflector 208 yields separated gas 214 and separated liquid 216.

Power source 202 provides three-phase AC power to sub-sea power supply 204 through a sub-sea transmission line (not shown). AC voltage levels received at sub-sea power supply 204 are converted, by sub-sea power supply 204, to useable levels for particle charger 206 and deflector 208.

Particle charger 206 includes multiple discharge electrodes (not shown) that, when a high voltage is applied, generate an electric field through extracted fluid 210. The electric field charges liquid particles in extracted fluid 210, the charged liquid particles being immersed in charged fluid 212, which is a non-conductive fluid, such as a gas. The electric field, in certain embodiments, is generated by a high DC voltage applied to the discharge electrodes. In alternative embodiments, the electric field is generated by a high AC voltage or a combination of AC and DC voltages. As the charged liquid particles move into deflector 208, another high voltage is applied to collection electrodes (not shown). The electric field generated by the collection electrodes forces the charged liquid particles along a path distinct from the path of the gas molecules in charged fluid 212. Deflector 208 produces outputs of separated gas 214 and separated liquid 216.

Compact electrostatic separator system 200 also includes a sub-sea vessel 218. Sub-sea vessel includes an interior 220 and an exterior 222. Interior 220 contains particle charger 206 and deflector 208, and defines an isolated environment in which separation processing is carried out. Exterior 222 is exposed to the sub-sea environment. Sub-sea power supply 204 is disposed at least partially on interior 220 of sub-sea vessel 218. Sub-sea power supply 204 provides the high DC voltage on interior 220 and receives the three-phase AC power on exterior 222. In certain embodiments, transformers, rectifiers, or both are disposed with interior 220. In alternative embodiments, transformers, rectifiers, or both are disposed on exterior 222. Location of the various components of sub-sea power supply 204 on interior 220 versus exterior 222 is a function of many considerations, including, without limitation, acceptable risk of failure, redundancy, power demand of compact electrostatic separator system 200, and desired useful service life of compact electrostatic separator system 200.

Figure 3:
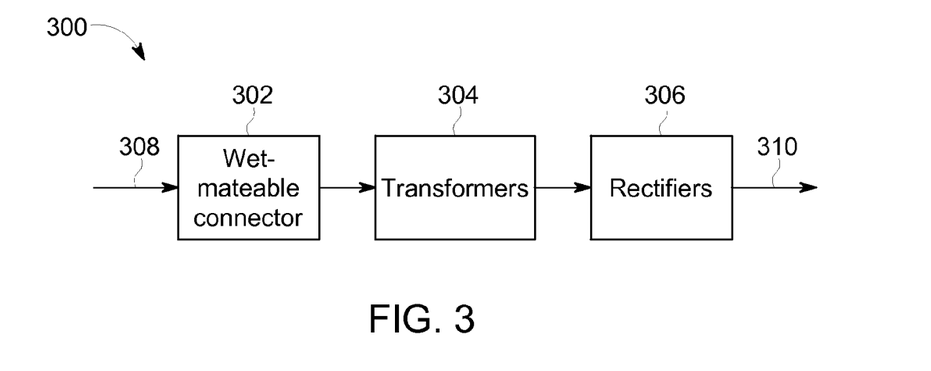
FIG. 3 is a block diagram of an exemplary sub-sea power supply for use in the compact electrostatic separator system shown in FIG. 2.

FIG. 3 is a block diagram of an exemplary sub-sea power supply 300 for use in compact electrostatic separator system 200 (shown in FIG. 2). Sub-sea power supply 300 includes a wet-mateable connector 302, transformers 304, and rectifiers 306. Wet-mateable connector 302 facilitates an electrical connection to a power umbilical 308 while submersed in the sub-sea environment. Power umbilical 308 delivers medium voltage AC power through wet-mateable connector 302 to transformers 304. In certain embodiments, power umbilical 308 delivers three-phase medium voltage AC power through wet-mateable connector 302. Medium voltage refers to voltages in the range of 2,000 to 20,000 Volts, inclusively. High voltage refers to voltages in excess of 20,000 Volts.

Transformers 304 convert the medium voltage AC to higher voltage AC. Transformers 304, in certain embodiments, may include, without limitation, low turn ratio transformers for stepping up the medium voltage AC. Low turn ratio transformers includes, for example and without limitation, 1:2 turn ratio transformers. In three-phase embodiments, transformers 304 include three-phase transformers.

The output higher voltage AC power from transformers 304 is converted to high voltage DC power 310 by rectifiers 306. Compact electrostatic separator system 200 (shown in FIG. 2) is generally insensitive to voltage quality and can therefore accept low-precision voltage ripple. Rectifiers 306 convert the higher voltage AC power to high voltage DC power 310. In certain embodiments, high voltage DC power 310 includes a well-rectified DC voltage, i.e., having a high-voltage-quality. In alternative embodiments, high voltage DC power 310 includes a low frequency ripple, i.e., a low voltage-quality. High voltage DC power 310 has a non-zero mean voltage having substantially uniform polarity. Substantially uniform polarity comprehends small reverse voltages that can appear across diodes.

Figure 4:
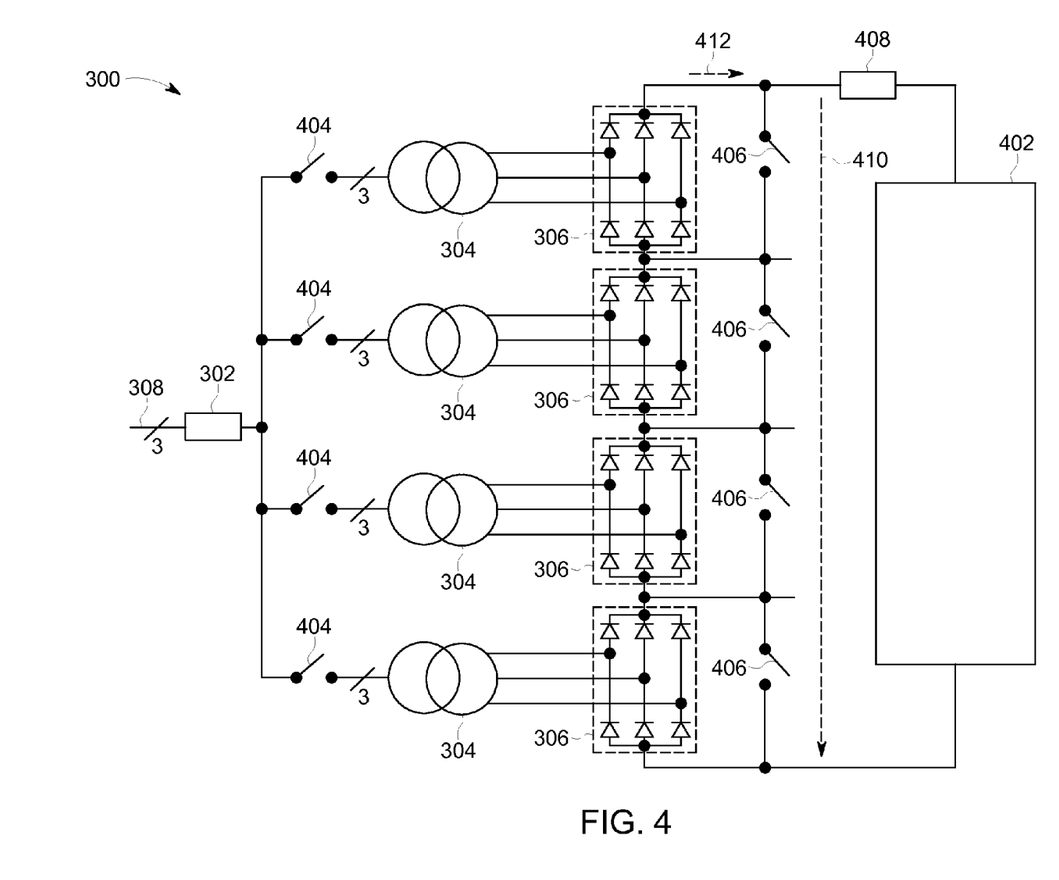
FIG. 4 is a schematic diagram of the sub-sea power supply shown in FIG. 3.

FIG. 4 is a schematic diagram of sub-sea power supply 300. Sub-sea power supply 300 includes wet-mateable connector 302 coupled to power umbilical 308, and powers a compact electrostatic separator 402. Sub-sea power supply 300 also includes transformers 304 and rectifiers 306, and further includes, without limitation, primary disconnect switches 404, bypass switches 406, and connector 408.

Power umbilical 308 transmits three-phase medium voltage AC power and couples to sub-sea power supply 300 through wet-mateable connector 302. Transformers 304 are coupled to wet-mateable connector 302 in parallel. Primary disconnect switches 404 are respectively coupled between transformers 304 and wet-mateable connector 302, and facilitate connecting or disconnecting one or more of transformers 304 from wet-mateable connector 302. Such a disconnection may be needed when one of transformers 304 require maintenance, repair, or replacement.

Transformers 304 convert the three-phase medium voltage AC power to a higher voltage three-phase AC power. Rectifiers 306 are respectively coupled to the three-phase outputs of transformers 304. Rectifiers 306 are further coupled in series, effectively operating as series-coupled DC power supplies. Each of rectifiers 306 is coupled in parallel with one of bypass switches 406. Bypass switches 406 facilitate independently bypassing DC output of each of rectifiers 306. When all of bypass switches 406 are open, a DC output voltage 410 is present across rectifiers 306.

Sub-sea power supply 300 couples to compact electrostatic separator 402 through connector 408. When connected, DC output voltage 410 delivers an output DC 412.

Figure 5:
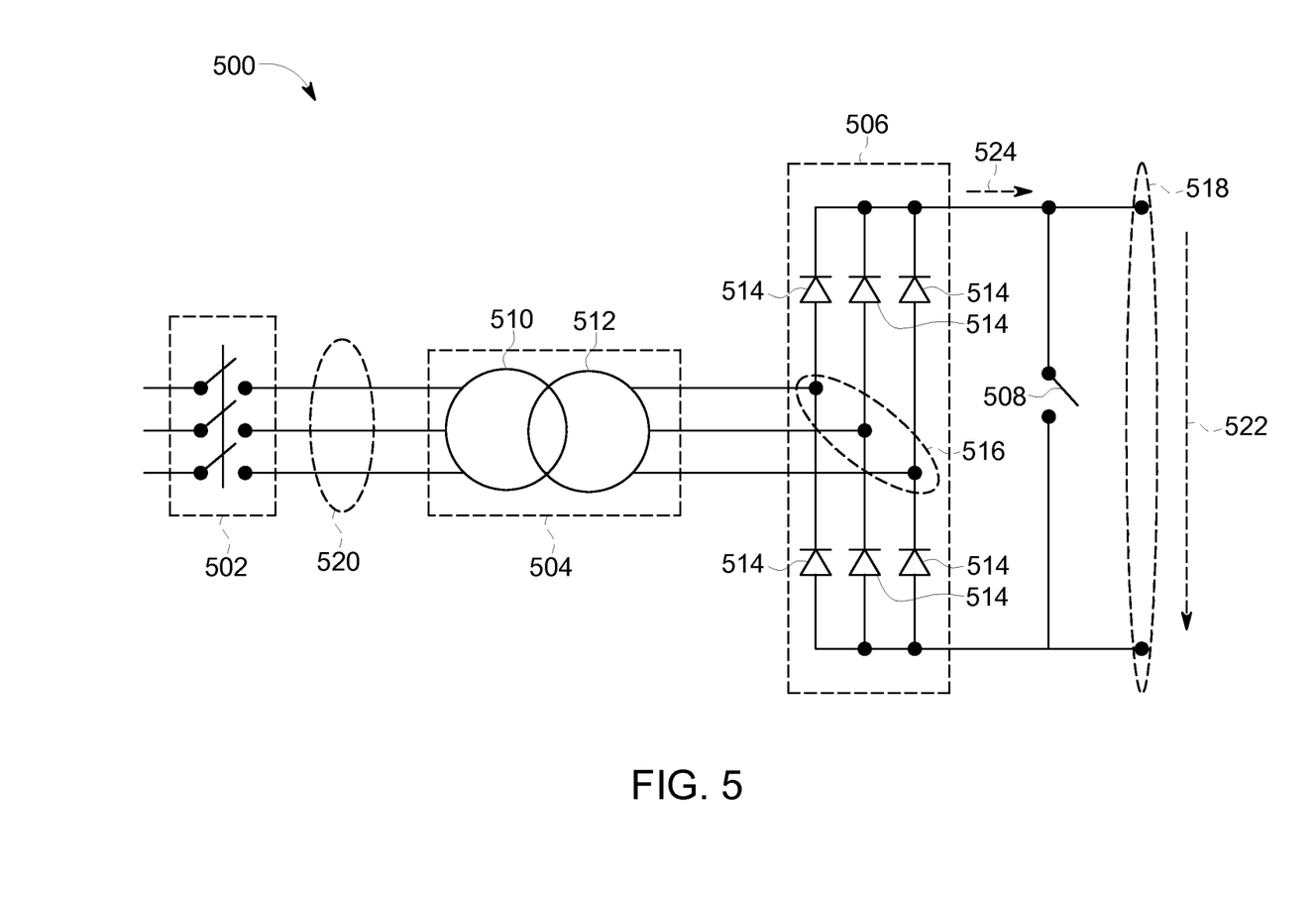
FIG. 5 is a detailed schematic diagram of a three-phase transformer and rectifier circuit that may be used with the sub-sea power supply shown in FIG. 4.

FIG. 5 is a detailed schematic of a three-phase transformer and rectifier circuit 500 that may be used with the sub-sea power supply 300 (shown in FIG. 4). Three-phase transformer and rectifier circuit 500 includes a three-phase primary disconnect switch 502, a three-phase transformer 504, a three-phase bridge rectifier 506, and a bypass switch 508. Three-phase transformer includes a primary coil 510 and a secondary coil 512. Three-phase bridge rectifier 506 includes diodes 514, input terminals 516, and output terminals 518.

Three-phase primary disconnect switch 502 is coupled in-line with three phase lines 520 feeding primary coil 510 of three-phase transformer 504. Three-phase primary disconnect switch 502 is operable to connect and disconnect three-phase power to three-phase transformer 504. Three-phase transformer 504 steps up the three-phase medium voltage present at primary coil 510 to a higher three-phase voltage present at secondary coil 512. The higher three-phase voltage output of three-phase transformer 504 is coupled to input terminals 516 of three-phase bridge rectifier 506.

Diodes 514 of three-phase bridge rectifier 506 produce an output voltage 522 across output terminals 518. Output voltage 522 is an at least partially rectified voltage signal with a low frequency ripple. Bypass switch 508 is coupled across output terminals 518 and is configured to short output terminals 518 should three-phase bridge rectifier 506 need to be disconnected from a load (not shown). When the load is connected and bypass switch 508 is open, an output current 524 is delivered to the load.

Figure 6:
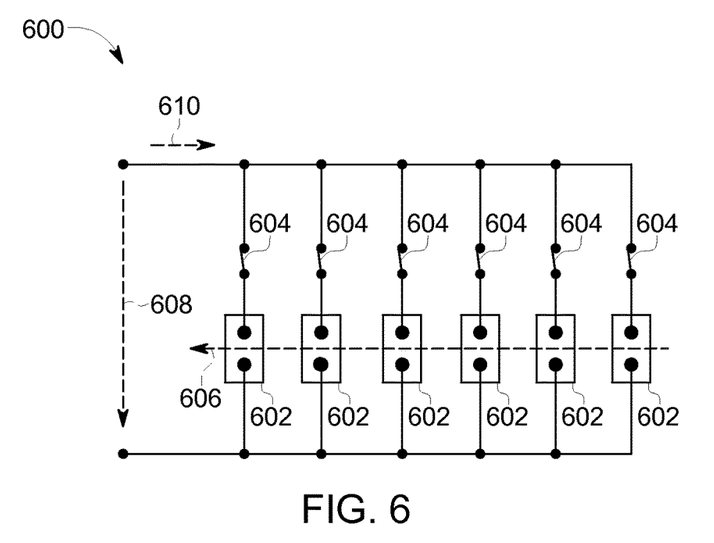
FIG. 6 is a detailed schematic diagram of a compact electrostatic separator that may be used with the sub-sea power supply shown in FIG. 4.

FIG. 6 is a detailed schematic diagram of a compact electrostatic separator 600 that may be used with the sub-sea power supply 300 (shown in FIG. 4). Compact electrostatic separator 600 includes multiple separator plate segments 602 and respective deactivation switches 604. Separator plate segments 602 are disposed such that a fluid flow 606 passes through the plates during a separation process.

Compact electrostatic separator 600 is configured to receive a DC output voltage 608, which generates an Output DC 610. Deactivation switches 604 illustrated in the closed position and are configured to independently disconnect DC output voltage 608 and output DC 610 from separator plate segments 602 in the event of a fault or other excessive power draw, which can occur, for example, when contamination exists in a given separator plate segment.

Figure 7:
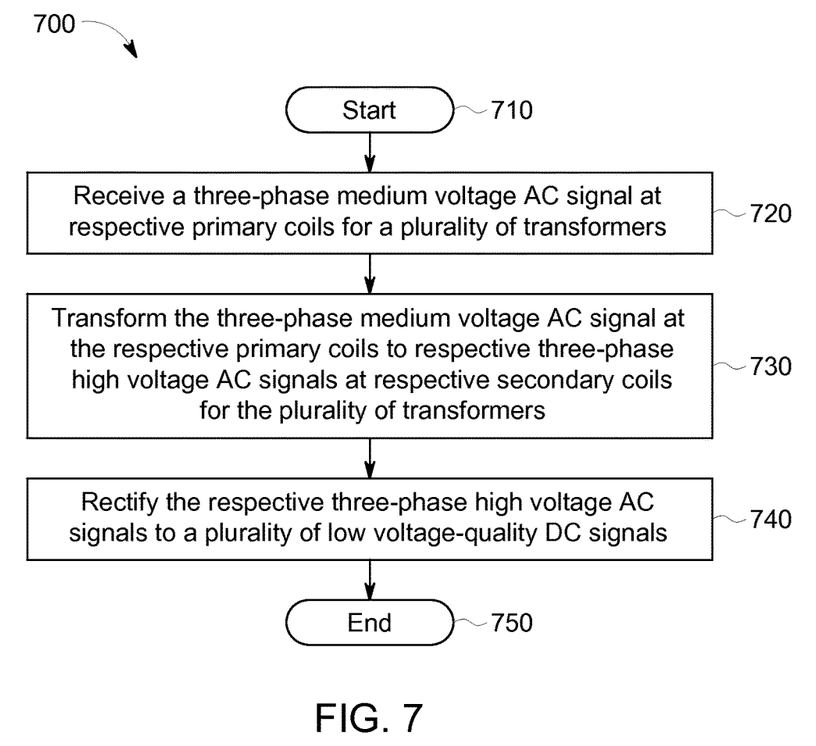
FIG. 7 is a flow diagram of an exemplary method of operating the sub-sea power supply shown in FIG. 3.

FIG. 7 is a flow diagram of an exemplary method 700 of operating sub-sea power supply 300 (shown in FIG. 3).

Method 700 begins at a start step 710. At a receiving step 720, a three-phase medium voltage AC signal is received at respective primary coils 510 for plurality of transformers 304. In certain embodiments, the method also includes coupling respective primary coils 510 for plurality of transformers 304 to a three-phase power source. The coupling may include, without limitation, closing respective primary disconnect switches 404 coupled in-line with the three-phase power source and respective primary coils 510.

The three-phase medium voltage AC signal is transformed, at a stepping up step 730, to respective higher voltage three-phase AC signals. The respective higher voltage three-phase AC signals are produced at respective secondary coils 512 for plurality of transformers 304. At a rectification step 740, the respective higher voltage three-phase AC signals are rectified to a plurality of low voltage-quality DC signals. In certain embodiments, the method also includes coupling the plurality of low voltage-quality DC signals in series to produce a low voltage-quality, high voltage DC signal. The coupling may include, without limitation, opening respective bypass switches 406 across which the respective low voltage-quality DC signals are present. The method then ends at an end step 750.

The above described power supply systems provide reliable sub-sea high-voltage power supplies and, more specifically, transformation, rectification, and switching circuits utilizing predominantly passive components. The realization that electrostatic separators can accept low voltage-quality power permits use of passive component rectifiers that produce low frequency ripples in the substantially DC output. Further, exemplary power supply systems utilize a medium voltage AC input and low turn ratio transformers to step-up the AC voltage. Exemplary power supply systems facilitate installation of compact electrostatic separators on the sea floor, which improves separation efficiency, reduces capital expenditures on equipment procurement, transportation, and installation, and further reduces costs for maintenance and repair by use of reliable and durable passive components.

An exemplary technical effect of the methods, systems, and apparatus described herein includes at least one of: (a) increased reliability and availability of sub-sea components; (b) reduced repair and maintenance costs for sub-sea equipment; (c) more compact sub-sea gas-liquid and liquid-liquid separation; (d) enhanced oil and gas recovery and exploration in ultra-deep water; and (e) independently controlled power disconnect of separator plate segments in compact electrostatic separators.

Exemplary embodiments of methods, systems, and apparatus for sub-sea power supplies are not limited to the specific embodiments described herein, but rather, components of systems and/or steps of the methods may be utilized independently and separately from other components and/or steps described herein. For example, the methods may also be used in combination with other non-conventional sub-sea power supplies, and are not limited to practice with only the systems and methods as described herein. Rather, the exemplary embodiment can be implemented and utilized in connection with many other applications, equipment, and systems that may benefit from increased reliability and availability, and reduced maintenance and cost.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sub-sea power supply comprising:
   a plurality of transformers, each of said plurality of transformers comprising a primary coil and a secondary coil, said primary coils coupled in parallel;
   a wet-mateable connector coupleable to a sub-sea alternating current (AC) power source, said wet-mateable connector coupled to said primary coils;
   a plurality of passive rectifier circuits respectively coupled to said secondary coils, said plurality of passive rectifier circuits configured to generate substantially uniform polarity voltage outputs coupled in series; and
   a plurality of bypass switches respectively coupled in parallel with the substantially uniform polarity voltage outputs, wherein said plurality of bypass switches are coupled in series with respect to each other.

2. The sub-sea power supply in accordance with claim 1 further comprising a plurality of primary disconnect switches respectively coupled between said wet-mateable connector and said primary coils.

3. The sub-sea power supply in accordance with claim 1, wherein said plurality of transformers are configured to receive a medium AC voltage from said wet-mateable connector, the medium AC voltage being in a range of 2,000 to 20,000 Volts, inclusively.

4. The sub-sea power supply in accordance with claim 3, wherein said plurality of transformers comprises a plurality of low turn-ratio transformers.

5. The sub-sea power supply in accordance with claim 1, wherein said plurality of transformers are configured to receive a three-phase AC voltage from said wet-mateable connector.

6. The sub-sea power supply in accordance with claim 1, wherein said plurality of passive rectifier circuits comprises a plurality of bridge rectifier circuits.

7. The sub-sea power supply in accordance with claim 1 further comprising a sub-sea vessel suitable for depths exceeding 3000 meters, said sub-sea vessel configured to enclose at least said plurality of passive rectifier circuits.

8. A method of operating a sub-sea power supply, said method comprising:
   receiving a first three-phase voltage AC signal at a plurality of transformers, the plurality of transformers disposed at a sea floor;
   transforming the first three-phase voltage AC signal at the plurality of transformers to second three-phase voltage AC signals, the first three-phase voltage AC signal being lower voltage than the second three-phase voltage AC signals;
   rectifying the second three-phase voltage AC signals to a plurality of low voltage-quality DC signals;
   coupling the plurality of low voltage-quality DC signals in series to generate a low voltage-quality high voltage DC signal; and opening a plurality of bypass switches configured to respectively short the low voltage-quality DC signals.

9. The method in accordance with claim 8 further comprising coupling the plurality of low voltage-quality DC signals in series, generating a low voltage-quality high voltage DC signal, the low voltage-quality high voltage DC signal being in excess of 20,000 Volts.

10. The method in accordance with claim 8 further comprising coupling a three-phase power source to the plurality of transformers.

11. The method in accordance with claim 10, wherein coupling the three-phase power source comprises closing a plurality of primary disconnect switches respectively coupled in-line with the plurality of transformers.

12. A sub-sea separator system comprising:
a wet-mateable connector;
a plurality of transformers coupled in parallel to said wet-mateable connector, said plurality of transformers configured to transform a first voltage AC signal receivable at said wet-mateable connector to a plurality of second voltage AC signals, the plurality of second voltage AC signals being higher voltage than the first voltage AC signal;
a plurality of rectifiers respectively coupled to said plurality of transformers, said plurality of rectifiers configured to rectify the plurality of second voltage AC signals to a plurality of DC voltage signals, each of said plurality of rectifiers comprising output terminals across which the plurality of DC voltage signals are presentable;
a plurality of bypass switches respectively coupled in parallel with said output terminals, said plurality of bypass switches further coupled in series; and
an electrostatic separator coupleable across the plurality of bypass switches, said electrostatic separator configured to receive a third voltage DC signal from said plurality of rectifiers, the third voltage DC signal comprising a sum of the plurality of DC voltage signals and being higher voltage than the plurality of second voltage AC signals.

13. The sub-sea separator system in accordance with claim 12 further comprising a sub-sea vessel, said sub-sea vessel comprising an interior and an exterior; said interior containing said electrostatic separator.

14. The sub-sea separator system in accordance with claim 13, wherein said interior further contains said plurality of rectifiers.

15. The sub-sea separator system in accordance with claim 13, wherein said interior further contains said plurality of transformers.

16. The sub-sea separator system in accordance with claim 13, wherein said sub-sea vessel is suitable for depths exceeding 3000 meters.

17. The sub-sea separator system in accordance with claim 12, wherein said plurality of transformers comprises four three-phase transformers, each of said four three-phase transformers having a 1:2 turn ratio.

18. The sub-sea separator system in accordance with claim 12, wherein said plurality of rectifiers comprises a plurality of three-phase bridge rectifiers, each of said plurality of three-phase bridge rectifiers comprising a plurality of diodes.

19. The sub-sea separator system in accordance with claim 12, wherein said electrostatic separator comprises:
a plurality of separator plates disposed in segments, said plurality of separator plates configured to receive the third voltage DC signal; and
a plurality of deactivation switches respectively coupled to said segments, said plurality of deactivation switches each operable to disconnect a segment of separator plates from the third voltage DC signal.

* * * * *